(12) United States Patent
Kamata et al.

(10) Patent No.: US 11,262,205 B2
(45) Date of Patent: Mar. 1, 2022

(54) TRAFFIC CONTROL APPARATUS, TRAFFIC CONTROL SYSTEM, TRAFFIC CONTROL METHOD, AND NON-TRANSITORY COMPUTER RECORDING MEDIUM

(71) Applicant: Toyota Jidosha Kabushiki Kaisha, Toyota (JP)

(72) Inventors: Nobuhide Kamata, Susono (JP); Yasuo Uehara, Gotemba (JP); Nozomu Hatta, Susono (JP); Shunsuke Tanimori, Susono (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 111 days.

(21) Appl. No.: 16/709,383

(22) Filed: Dec. 10, 2019

(65) Prior Publication Data

US 2020/0191584 A1 Jun. 18, 2020

(30) Foreign Application Priority Data

Dec. 12, 2018 (JP) .............................. JP2018-232679

(51) Int. Cl.
G01C 21/34 (2006.01)
G01C 21/36 (2006.01)

(52) U.S. Cl.
CPC ..... *G01C 21/3438* (2013.01); *G01C 21/3605* (2013.01); *G01C 21/3691* (2013.01)

(58) Field of Classification Search
CPC ................................................. G01C 21/3438
See application file for complete search history.

(56) References Cited

U.S. PATENT DOCUMENTS

| 2015/0039211 | A1* | 2/2015 | Stefan | G08G 1/144 |
| | | | | 701/117 |
| 2016/0125736 | A1* | 5/2016 | Shaik | G08G 1/14 |
| | | | | 701/23 |
| 2017/0118307 | A1* | 4/2017 | Beaurepaire | G08G 1/143 |
| 2017/0183001 | A1* | 6/2017 | Yamamoto | B60W 10/10 |
| 2019/0103028 | A1 | 4/2019 | Kobayashi et al. | |

FOREIGN PATENT DOCUMENTS

JP 2017-182137 A 10/2017

* cited by examiner

*Primary Examiner* — Anne Marie Antonucci
*Assistant Examiner* — Abdalla A Khaled
(74) *Attorney, Agent, or Firm* — Dinsmore & Shohl LLP (57) ABSTRACT

A control part of a traffic control apparatus receives from a car-mounted device of one vehicle among a plurality of vehicles through a communicating part a projected time of arrival of that one vehicle at a destination and, if so, judges if there is a simultaneously arriving vehicle with the same desired drop-off position at the destination as the one vehicle and with the projected time of arrival at the destination in the same time frame from among the plurality of vehicles and, if there is a simultaneously arriving vehicle, determines vehicle stopping priorities at the desired drop-off position between the one vehicle and the simultaneously arriving vehicle based on information relating to the passengers in the one vehicle and the simultaneously arriving vehicle to be dropped off at the destination.

7 Claims, 6 Drawing Sheets

TRAFFIC CONTROL APPARATUS, TRAFFIC CONTROL SYSTEM, TRAFFIC CONTROL METHOD, AND NON-TRANSITORY COMPUTER RECORDING MEDIUM

CROSS-REFERENCE TO RELATED APPLICATIONS

This application claims priority to Japanese Patent Application No. 2018-232679 filed on Dec. 12, 2018, which is incorporated herein by reference in its entirety including the specification, drawings and abstract.

FIELD

The present disclosure relates to a traffic control apparatus, traffic control system, traffic control method, and non-transitory computer recording medium.

BACKGROUND

In recent years, development work has been proceeding on automated driving technology with an eye on realization of taxi, bus, rideshare, and other mobility services using automated driving vehicles automatically operated for driving. Japanese Unexamined Patent Publication No. 2017-182137 discloses as one such mobility service the technology relating to a car dispatch service for making an automated driving vehicle travel to a desired pickup point of a customer in response to a request for use of the customer and making the automated driving vehicle pick up the customer and transport him or her to the destination.

SUMMARY

If the destinations of passengers picked up in different automated driving vehicles are the same, sometimes a plurality of automated driving vehicles will arrive at a destination at the same time frame and sometimes the desired drop-off points of the passengers will become the same. In such a case, if ending up allowing the automated driving vehicle first arriving at the destination to preferentially stop at the desired drop-off position, for example, when the automated driving vehicle first arriving at the destination has picked up a young healthy person while the automated driving vehicle later arriving at the destination has picked up a senior citizen etc., the situation will arise where the senior citizen etc. will not be able to be dropped off at the desired drop-off point and will have to be dropped off at a point far from the desired drop-off point and will be liable to be seriously inconvenienced. That is, a passenger who should be preferentially dropped off at the desired drop-off point is liable to be unable to be dropped off at the desired drop-off point.

The present disclosure was made focusing on such a problem point and has as its object to enable a passenger who should be preferentially dropped off at the desired drop-off point to be dropped off at the desired drop-off point if there are a plurality of passengers picked up by different automated driving vehicles and desiring to be dropped off at certain desired drop-off points.

To solve the above problem, the traffic control apparatus according to one aspect of the present disclosure comprises a communicating part configured to be able to communicate with car-mounted devices mounted in a plurality of vehicles controlled to be automatically driven and a control part. Further, the control part is configured to receive from the car-mounted device of one vehicle among the plurality of vehicles through the communicating part a projected time of arrival of that one vehicle at a destination and, if so, judge if, among the plurality of vehicles, there is a simultaneously arriving vehicle with the same desired drop-off position at the destination as the one vehicle and with the projected time of arrival at the destination at the same time frame and, if there is a simultaneously arriving vehicle, determine vehicle stopping priorities at the desired drop-off position between the one vehicle and the simultaneously arriving vehicle based on information relating to the passengers in the one vehicle and the simultaneously arriving vehicle to be dropped off at the destination.

Further, the traffic control system according to another aspect of the present disclosure is provided with car-mounted devices mounted in a plurality of vehicles which are controlled to be automatically driven and a server connected to be able to communicate with the car-mounted devices through a network. Further, each car-mounted device is configured to calculate a projected time of arrival of one vehicle at a destination among a plurality of vehicles in which the car-mounted devices are mounted and to send the same to the server, and the server is configured to receive a projected time of arrival of one vehicle at the destination and, if so, judge if, among the plurality of vehicles, there is a simultaneously arriving vehicle with the same desired drop-off position at the destination as the one vehicle and with the projected time of arrival at the destination in the same time frame and, if there is a simultaneously arriving vehicle, determine vehicle stopping priorities at the desired drop-off position between the one vehicle and the simultaneously arriving vehicle based on information relating to the passengers in the one vehicle and the simultaneously arriving vehicle to be dropped off at the destination.

Further, the traffic control method according to one aspect of the present disclosure comprises receiving through a communicating part configured to be able to communicate with car-mounted devices mounted in a plurality of vehicles which are controlled to be automatically driven from a car-mounted device of one vehicle among the plurality of the vehicles a projected time of arrival of the one vehicle at a destination and, when so, judging if, among the plurality of vehicles, there is a simultaneously arriving vehicle with the same desired drop-off position at the destination as the one vehicle and with the projected time of arrival at the destination in the same time frame and, if there is a simultaneously arriving vehicle, determining vehicle stopping priorities at the desired drop-off position between the one vehicle and the simultaneously arriving vehicle based on information relating to the passengers in the one vehicle and the simultaneously arriving vehicle to be dropped off at the destination.

Further, the non-transitory computer recording medium according to one aspect of the present disclosure includes a computer program for traffic control use for making a computer receive through a communicating part configured to be able to communicate with car-mounted devices mounted in a plurality of vehicles which are controlled to be automatically driven from a car-mounted device of one vehicle among the plurality of the vehicles a projected time of arrival of the one vehicle at a destination and, when so, judge if, among the plurality of vehicles, there is a simultaneously arriving vehicle with the same desired drop-off position at the destination as the one vehicle and with the projected time of arrival at the destination in the same time frame and, if there is a simultaneously arriving vehicle, determine vehicle stopping priorities at the desired drop-off position between the one vehicle and the simultaneously arriving vehicle based on information relating to the passengers in the one vehicle and the simultaneously arriving vehicle to be dropped off at the destination.

According to these aspects of the present disclosure, it is possible to enable a passenger who should be preferentially dropped off at a desired drop-off point to be dropped off at the desired drop-off point if there are a plurality of passengers picked up in different automated driving vehicles desiring to be dropped off at a certain desired drop-off point.

DESCRIPTION OF EMBODIMENTS

Below, referring to the drawings, embodiments of the present disclosure will be explained in detail. Note that, in the following explanation, similar component elements are assigned the same reference notations.

Figure 1:
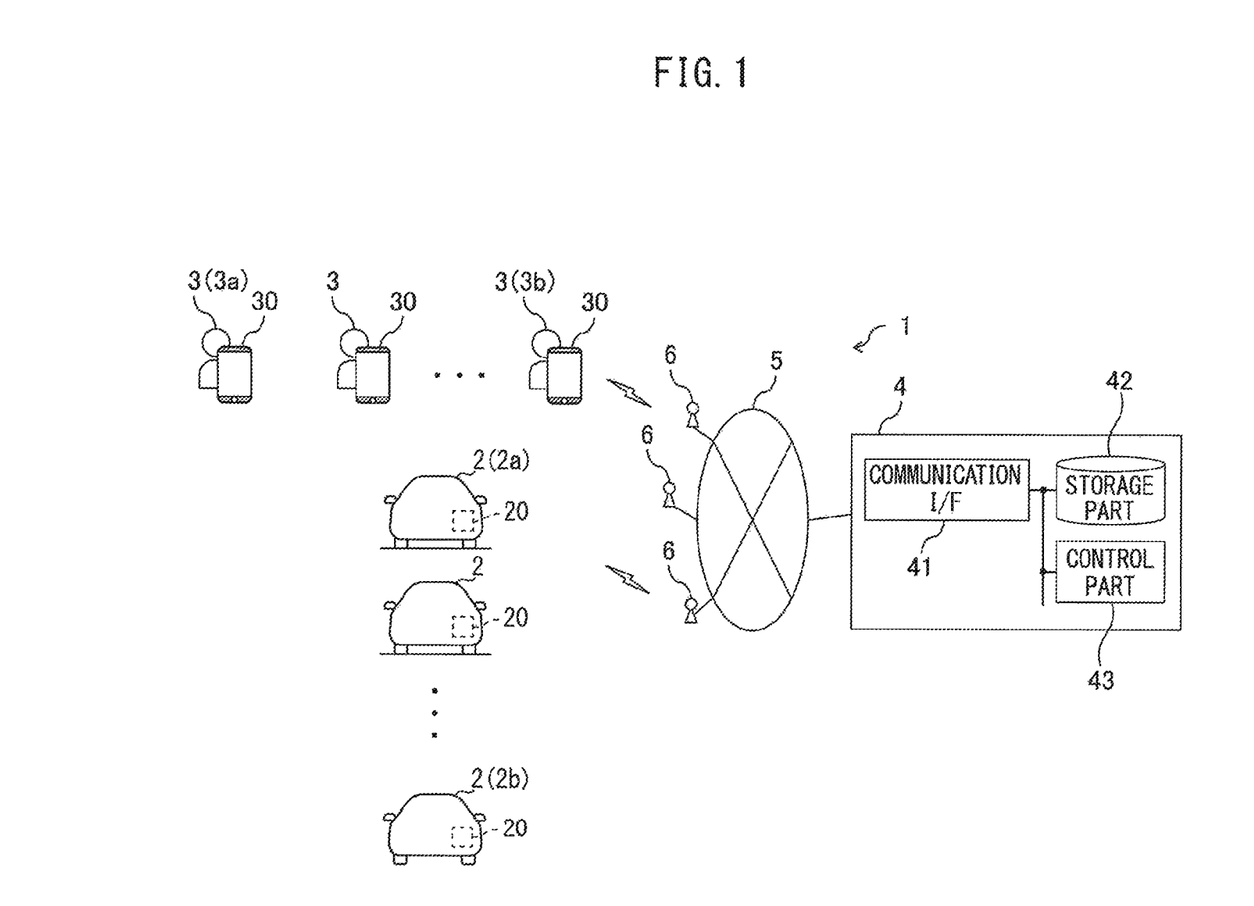
FIG. 1 is a view of a schematic configuration of a traffic control system according to one embodiment of the present disclosure.

FIG. 1 is a view of a schematic configuration of a traffic control system 1 according to one embodiment of the present disclosure.

The traffic control system 1 according to the present embodiment is provided with car-mounted devices 20 mounted in a plurality of vehicles 2 which are controlled to be automatically driven and a server 4 as one example of a traffic control apparatus. Each vehicle 2 according to the present embodiment is, for example, an automated driving vehicle providing a taxi or other car dispatch service. The plurality of the customers 3 utilizing the car dispatch service respectively have mobile terminals 30.

The car-mounted devices 20, mobile terminals 30, and server 4 are able to communicate with each other through a network 5 comprised of optical communication lines etc. The car-mounted devices 20 and mobile terminals 30 are, for example, connected with the network 5 through a wireless base station 6 etc. Further, the server 4 is, for example, connected with the network 5 through a not shown gateway etc.

Figure 2:
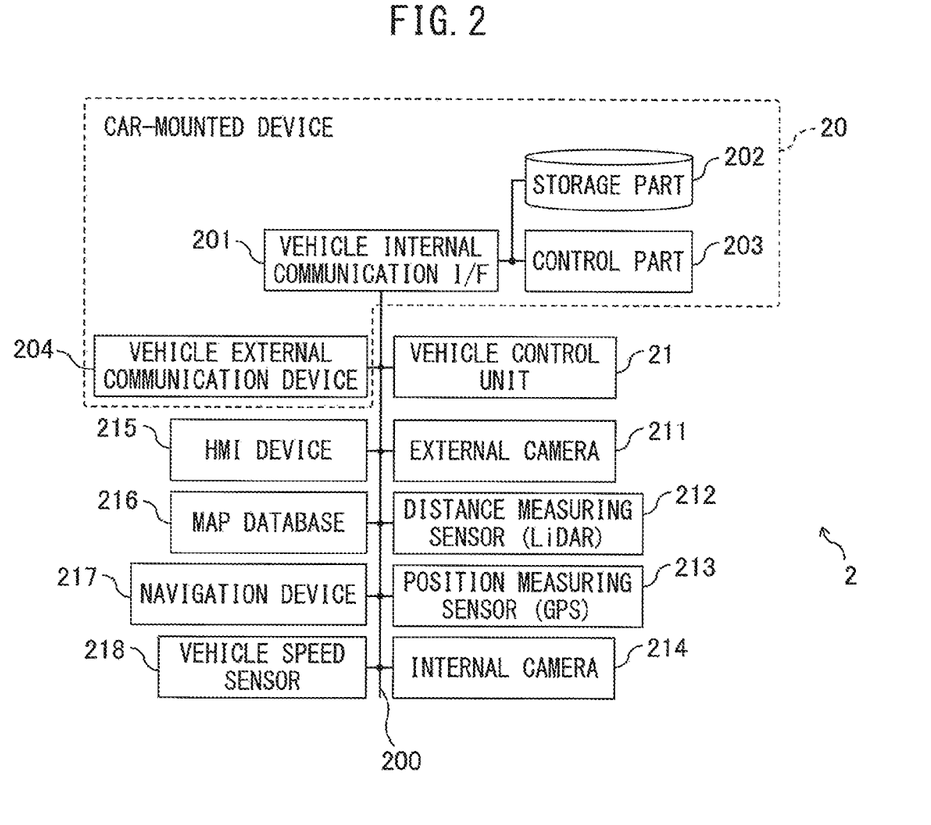
FIG. 2 is a view of a hardware configuration of a vehicle according to one embodiment of the present disclosure.

FIG. 2 is a view of a hardware configuration of a vehicle 2.

As shown in FIG. 2, each vehicle 2 is provided with components connected with each other through an internal network 200 such as the car-mounted device 20, a vehicle control unit 21, outside camera 211, distance measuring sensor 212, position measuring sensor 213, inside camera 214, HMI (Human Machine Interface) device 215, map database 216, navigation device 217, and vehicle speed sensor 218. The internal network 200, for example, is made a network based on the CAN (Controller Area Network) standard.

Each car-mounted device 20 is provided with components connected with each other through signal wires such as an internal communication interface (below, referred to as the "internal communication I/F") 201, a storage part 202, and a control part 203. Further, each car-mounted device 20 is provided with an external communication device 204 connected to the internal communication I/F 201 through the internal network 200.

The internal communication I/F 201 is a communication I/F circuit for the car-mounted device 20 to communicate with the external communication device 204 and the other car-mounted equipment of the vehicle 2 (for example outside camera 211 etc.) through the internal network 200.

The storage part 202 has an HDD (Hard Disk Drive), optical storage medium, or semiconductor memory or other storage medium and stores a computer program to be run at the control part 203. Further, the storage part 202 stores data generated by the control part 203 and data which the control part 203 receives through the internal network 200 from the external communication device 204 and other car-mounted equipment of the vehicle 2.

The control part 203 can be made one or more processors for running a computer program for control and processing in the car-mounted device 20 and their peripheral circuits.

The external communication device 204 is a car-mounted terminal having a wireless communication function. The external communication device 204, for example, accesses the wireless base station 6 connected with the network 5 through a not shown gateway etc. to thereby be connected through the wireless base station 6 to the network 5. Due to this, it communicates with the server 4. Further, the external communication device 204 is designed to utilize Wi-Fi® or Bluetooth® or other near field communication to be able to communicate with the mobile terminals 30 of the customers 3.

The vehicle control unit 21 automatically performs driving operations relating to acceleration, steering, and braking so that the vehicle 2 is automatically driven along a driving route prepared by the navigation device 217 based on signals output from the outside camera 211, distance measuring sensor 212, position measuring sensor 213, inside camera 214, etc.

The outside camera 211 captures and outputs a video of the surroundings of the vehicle 2. The video captured by the outside camera 211 is utilized by the vehicle control unit 21 for automatically controlling the operation of the vehicle 2. The outside camera 211 is arranged for example near the front glass of the vehicle 2 with the imaging surface facing the outside of the vehicle so that objects and people in the surroundings of the vehicle 2 are clearly captured.

The distance measuring sensor 212 measures the distance to an object present in the surroundings of the vehicle 2 for each orientation. The distance information measured by the distance measuring sensor 212 is similarly utilized by the vehicle control unit 21 for automatically controlling the operation of the vehicle 2. The distance measuring sensor 212 is, for example, made a LiDAR (Light Detection And Ranging) device installed at the vehicle 2.

The position measuring sensor 213 generates and outputs current position information showing the current location of the vehicle 2. The current position information of the vehicle 2 generated by the position measuring sensor 213 is utilized by the vehicle control unit 21 for automatically controlling the operation of the vehicle 2 and also is sent through the network 5 from the car-mounted device 20 (more particularly the external communication device 204) to the server 4 so that the server 4 can obtain a grasp of the current position of the vehicle 2. The position measuring sensor 213 is, for example, made a GPS (Global Positioning System) installed at the vehicle 2.

The inside camera 214 captures video of the inside of the car and outputs it to the car-mounted device 20 and the vehicle control unit 21. The video captured by the inside camera 214 is utilized for the car-mounted device 20 to sense a customer 3 being picked up by the vehicle 2 or being dropped off from the vehicle 2. A plurality of inside cameras 214 may be arranged inside the car. An inside camera 214 is, for example, arranged at the ceiling at the front of the vehicle 2 etc. so that a customer 3 inside the car is clearly captured.

The HMI device 215 is configured to enable information to be traded between the car-mounted device 20 of the vehicle 2 and the customer 3 of the vehicle 2. The HMI device 215 according to the present embodiment is provided with a display as an information display screen arranged at a position which the customer 3 of the vehicle 2 can view and a touch panel as an operating device for the customer 3 of the vehicle 2 to perform entry operations and response operations. The customer 3 can be shown various types of information (for example, text information or graphic information) on the display.

The map database 216 is a database relating to map information. The map database 216, for example, is stored in a hard disk drive (HDD) mounted in the vehicle 2. The map information includes position information of the roads and information on the road shapes (for example, curved or straight type, curvature of curve, etc.), position information of intersections and turnoffs, road types, and other information.

The navigation device 217 refers to the map information of the map database 216 and prepares and outputs a driving route to a destination based on the current position of the vehicle 2 detected by the position measuring sensor 213 and the desired pickup point and destination of the customer 3 picked up by the vehicle 2.

The vehicle speed sensor 218 measures and outputs the speed of the vehicle 2. The speed of the vehicle 2 measured by the vehicle speed sensor 218 is utilized by the vehicle control unit 21 for automatically controlling the operation of the vehicle 2 and also is utilized by the car-mounted device 20 to obtain a grasp of the projected time of arrival of when the vehicle 2 arrives at the destination.

Returning to FIG. 1, the server 4 has components connected with each other through signal wires such as a communication interface (below, referred to as the "communication I/F") 41, the storage part 42, and the control part 43.

The communication I/F 41 is one example of a communicating part and is a communication I/F circuit for connecting the server 4 to the network 5 through for example a gateway etc. The communication I/F 41 is configured to be able to communicate with the car-mounted devices 20 of the vehicles 2 (more particularly the external communication devices 204) and mobile terminals 30 through the network 5.

The storage part 42 has an HDD (Hard Disk Drive), optical storage medium, or semiconductor memory or other storage medium and stores a computer program run by the control part 43. Further, the storage part 42 stores data generated by the control part 43, data received by the control part 43 through the network 5, etc.

Further, the storage part 42 stores, as one example of information relating to the vehicles 2, identification information of the vehicles 2 and the car models and other information. The identification information of the vehicles 2 includes, for example, the license plate numbers of the vehicles 2, identification numbers displayed on the door surfaces etc. of the vehicles 2, etc. Furthermore, the storage part 42 stores, as one example of information relating to the customers 3, identification information of the customers 3, their addresses, ages, presence of any disabilities and the classes of the same, presence of any sickness and severities of the same, any pregnancy, and other information. The identification information of the customers 3, for example, are customer numbers assigned to the customers 3 utilizing the car dispatch service.

The control part 43 can be made one or more processors for running a computer program for control or processing of the later explained traffic control processing etc. at the server 4 and their peripheral circuits.

The control part 43 receives a car dispatch request sent from a mobile terminal 30 of one customer 3a trying to utilize a car dispatch service through the communication I/F 41. If so, it determines the vehicle 2a (responding vehicle) for picking up the customer 3 requesting car dispatch from the plurality of the vehicles 2 and sends the car-mounted device 20 of the vehicle 2a a car dispatch instruction through the communication I/F 41.

Further, if the car-mounted device 20 of the vehicle 2a receives the car dispatch instruction through the external communication device 204, the vehicle control unit 21 is used to make the vehicle 2a be automatically driven to make the vehicle 2a travel to the desired pickup point of the customer 3a to pick up the customer 3a, then make the vehicle 2 travel to the destination of the customer 3a.

The vehicle 2a arriving at the destination usually is made to stop at a desired drop-off point of the customer 3a and to drop off the customer 3a there. The desired drop-off point is made one section of a drop-off area determined in advance in accordance with the destination. The drop-off area, for example, when the destination is a hotel or a hospital, department store, shopping mall, or other such lodging facility or medical facility, commercial facility, or composite facility, is a certain area in front of the entrance of these facilities or a parking space in a certain area of a parking lot owned by these facilities. Further, if the destination is for example a train station, it is a certain area of the rotary in front of the train station.

Here, if the destinations of the customers 3 picked up by different vehicles 2 are the same, sometimes a plurality of vehicles 2 will arrive at the destination at the same time frame and sometimes the desired drop-off points of the customers 3 will become the same point. In such a case, if ending up allowing the vehicle 2 first arriving at the destination to preferentially stop at the desired drop-off position, for example, when the vehicle 2 first arriving at the destination has picked up a young healthy person while the vehicle 2 later arriving at the destination has picked up a senior citizen or pregnant woman, a person accompanied with an infant or toddler, a disabled person, sick person, etc. (below, referred to as a "senior citizen etc."), the situation will arise where the senior citizen etc. will not be able to be dropped off at the desired drop-off point and for example will have to be dropped off at a point far from the entrance of the facilities and is liable to be seriously inconvenienced.

Therefore, in the present embodiment, if it is projected that a plurality of vehicles 2 will arrive at a certain destination at the same time frame, when the desired drop-off points of the customers 3 are the same, it is made possible to determine the vehicle stopping priorities at the desired drop-off points of the vehicles 2 based on vehicle stopping priority determination information for judging if a passenger corresponds to a senior citizen etc. in the information relating to the customers 3 and preferentially make a vehicle 2 with the high vehicle stopping priority stop at the desired drop-off point.

In the present embodiment, as vehicle stopping priority determination information, information relating to the age of each customer 3, any pregnancy, any accompanying infants or toddlers, any disability and its degree, and any sickness and its severity is employed. Further, in the present embodiment, these pieces of information are assigned points for determination of the vehicle stopping priority in advance in accordance with the contents of the information. A vehicle 2 in which a customer 3 with a large sum of points has been picked up is determined as a vehicle 2 having a high vehicle stopping priority.

Note that, the vehicle stopping priority determination information is not limited to the above-mentioned information. Other information may be added. Further, it is also possible to delete some of the above-mentioned information. Further, the method of determination of the vehicle stopping priority is also not limited to the above-mentioned method. For example, a vehicle 2 in which a customer 3 with large corresponding information has been picked up may be determined as a vehicle 2 having a high vehicle stopping priority.

Figure 3:
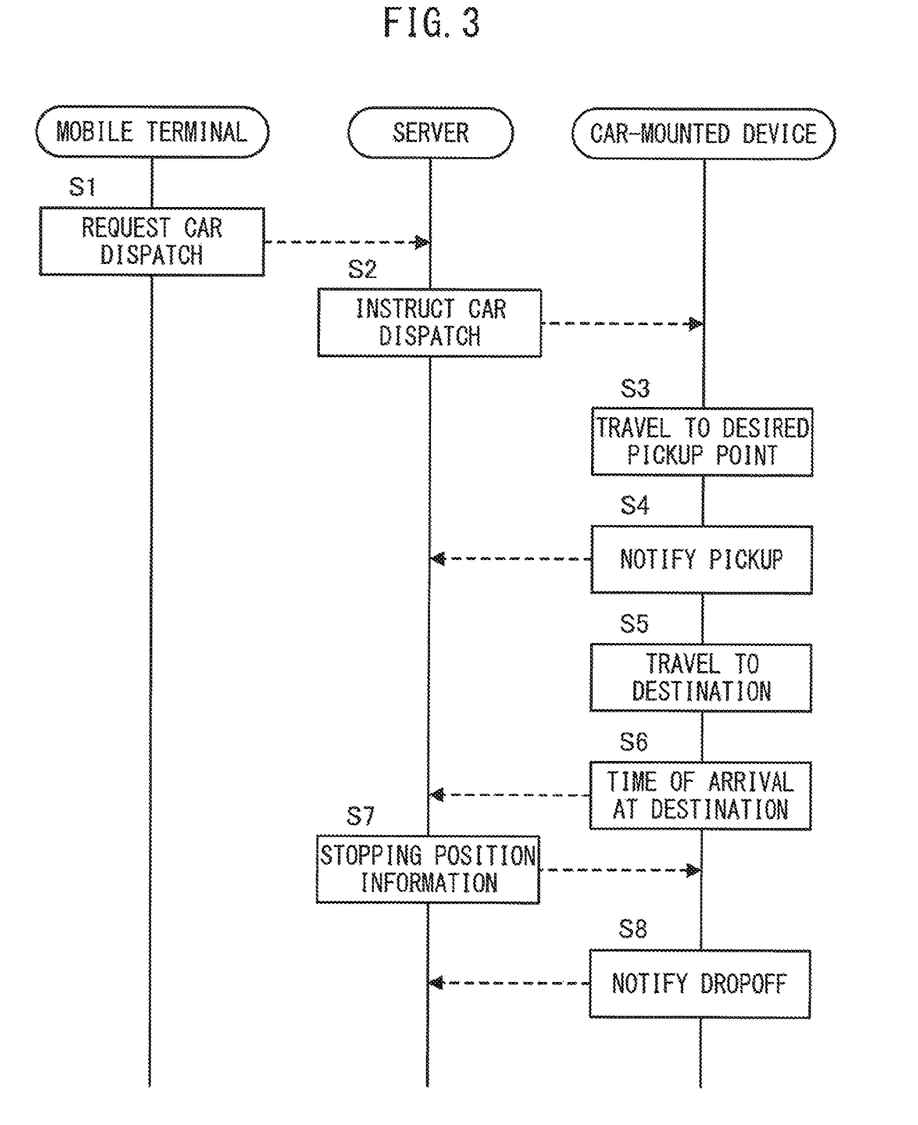
FIG. 3 is a sequence diagram showing one example of traffic control processing according to one embodiment of the present disclosure.

FIG. 3 is a sequence diagram showing one example of traffic control processing according to the present embodiment. In the sequence diagram shown in FIG. 3, communication between the server 4 and the car-mounted devices 20 and mobile terminals 30 of the vehicle 2 is performed through the network 5.

At step S1, one customer 3a among the plurality of the customers 3 operates the mobile terminal 30 which he or she owns so as to send a car dispatch request to the server 4. The car dispatch request includes the effect of requesting car dispatch and also identification information of the customer 3a, the desired pickup point, the destination, the desired drop-off point, and other information. The current location of the customer 3a, the desired pickup point, the destination, and the desired drop-off point are, for example, designated by the name of the facility and its address or a combination of its latitude and longitude.

Note that, when designating the destination, it is also possible to automatically set a drop-off point set in advance corresponding to that destination as the desired drop-off point. Further, the vehicle stopping priority determination information for judging if a passenger corresponds to a senior citizen etc. may be made to be included in the car dispatch request by the customer 3a operating a mobile terminal 30 when requesting car dispatch so as to enter the vehicle stopping priority determination information, or vehicle stopping priority determination information which the customer 3a registers in advance may be stored in the storage part 42 of the server 4.

At step S2, the server 4 receiving the car dispatch request searches for vehicles 2 present within a certain distance from the desired pickup point of the customer 3a, selects an available vehicle 2a from the at least one vehicle 2 found as the responding vehicle of the customer 3a, and sends the car-mounted device 20 of the vehicle 2a selected as the responding vehicle a car dispatch instruction so as to head toward the desired pickup point of the customer 3a. The car dispatch instruction includes identification information of the customer 3, the desired pickup point, destination, the desired drop-off point, and other information which had been contained in the car dispatch request of the customer 3a.

At step S3, the car-mounted device 20 of the vehicle 2a receiving the car dispatch instruction uses the vehicle control unit 21 to make the vehicle 2a be automatically driven and make the vehicle 2a travel to the desired pickup point of the customer 3a. Note that the car-mounted device 20 periodically sends the server 4 position information showing the current location of the vehicle 2a while the vehicle 2a is being automatically driven by the vehicle control unit 21.

At step S4, the car-mounted device 20 of the vehicle 2a traveling to the desired pickup point of the customer 3a communicates with the mobile terminal 30 of the customer 3a by for example near field communication to confirm that he or she is the customer 3a who made the car dispatch request (matching), then unlocks the door to permit pickup of the customer 3a. Further, if the car-mounted device 20 of the vehicle 2a, for example, confirms by an opening/closing operation of the door or by the inside camera 214 that the customer 3a has been picked up, it sends a pickup notification to the server 4.

At step S5, the car-mounted device 20 of the vehicle 2a picking up the customer 3a makes the navigation device 217 mounted in the vehicle 2a prepare the driving route based on the current location of the vehicle 2a and the destination or desired drop-off point or other information of the customer 3a contained in the car dispatch instruction. Further, the car-mounted device 20 instructs the vehicle control unit 21 so as to automatically drive the car in accordance with the prepared driving route and makes the vehicle 2a travel toward the destination of the customer 3a. The driving route of the vehicle 2a may be prepared at the server 4 and sent to the car-mounted device 20 of the vehicle 2a.

At step S6, the car-mounted device 20 of the vehicle 2a picking up the customer 3a periodically calculates the time at which the vehicle 2a will arrive at the desired drop-off point at the destination of the customer 3a (below, referred to as the "time of arrival at the destination") based on position information, which shows the current location of the vehicle 2a driving on the driving route, the vehicle speed and other information and sends it to the server 4 each time calculating it.

At step S7, the server 4 receiving the time of arrival at the destination of the vehicle 2a searches through the plurality of the vehicles 2 to determine if there is one or more other vehicles 2 with the same desired drop-off point at the destination as the vehicle 2a picking up the customer 3a and if there are such vehicles 2, further searches among them for a vehicle 2b with a time of arrival at the destination at the same time frame as the vehicle 2a (for example, a time frame of several minutes before and after the projected time of arrival of the vehicle 2a) (below, referred to as a "simultaneously arriving vehicle").

Further, if there is a simultaneously arriving vehicle 2b, the server 4 determines the vehicle stopping priorities of the vehicle 2a and simultaneously arriving vehicle 2b based on the vehicle stopping priority determination information of the customers 3 picked up by the vehicle 2a and simultaneously arriving vehicle 2b. Further, the server 4 determines the stopping positions of the vehicle 2a and simultaneously arriving vehicle 2b in the drop-off area of the destination based on the vehicle stopping priorities of the vehicle 2a and simultaneously arriving vehicle 2b and sends the stopping position information to the car-mounted devices 20 of the vehicle 2a and simultaneously arriving vehicle 2b.

Figure 4:
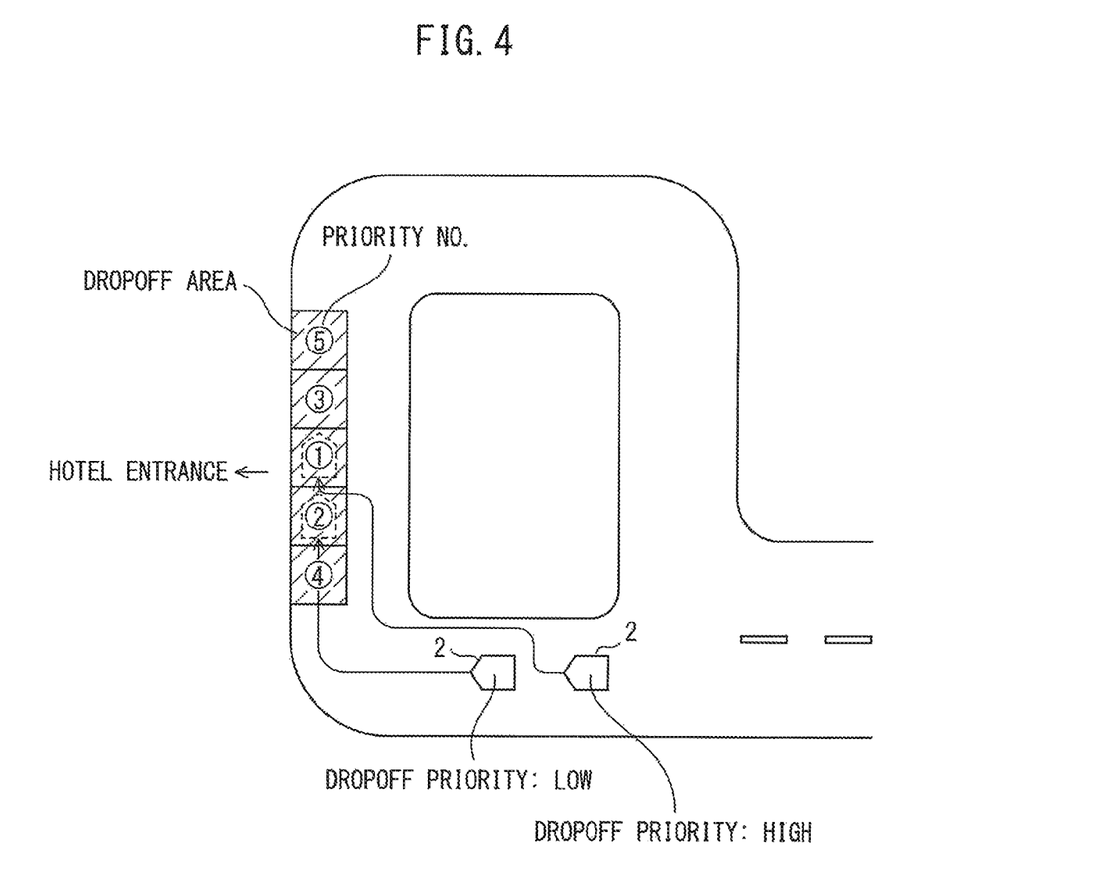
FIG. 4 is a view showing one example of a method of determining stopping positions of vehicles according to one embodiment of the present disclosure in the case where the desired drop-off points of two vehicles are a drop-off area in front of an entrance of a hotel etc.

Specifically, if the desired drop-off points of two vehicles 2 are set to the drop-off area in front of the entrance of a hotel etc., the server 4 for example performs the following to determine the stopping positions of the vehicles 2.

As shown in FIG. 4, for example, the drop-off area in front of the entrance of a hotel etc. is divided in advance into a plurality of sections. Priority numbers (in the example, shown in FIG. 4, no. 1 to no. 5) are assigned in order from the section with the highest convenience and safety. Further, as shown in FIG. 4, if it is expected that the two vehicles 2 will simultaneously arrive at the hotel, when the desired drop-off points of the customers 3 of the vehicles 2 are set to the no. 1 section in the drop-off area in front of the hotel entrance, the server 4 sets the stopping position of the vehicle 2 with the high vehicle stopping priority as the desired drop-off point of the customer 3 picked up by the vehicle with the high vehicle stopping priority, that is, the no. 1 section, and sets the stopping position of the vehicle 2 with the low vehicle stopping priority as the no. 2 section with the next highest convenience and safety after the no. 1 section.

Due to this, it is possible to make the vehicles 2 stop at suitable positions corresponding to their vehicle stopping priorities to drop off the customers 3 picked up by the vehicles 2.

Note that, in this case, if not bothering to satisfy the customer 3 of the vehicle 2 with the low vehicle stopping priority in any way and ending up stopping at a point different from the desired drop-off point and forcibly dropping him or her off there, the customer 3 is liable to feel dissatisfied. Therefore, in such a case, it is also possible to display to the customer 3 of the vehicle 2 with the low vehicle stopping priority through the HMI device 215 of the vehicle 2 the reason why it is not possible to stop at the desired drop-off point or to seek a request for drop-off at a point different from the desired drop-off point. Further, if the request for drop-off is refused, it is also possible to wait until the vehicle with the high vehicle stopping priority moves off from the desired drop-off position.

Figure 5:
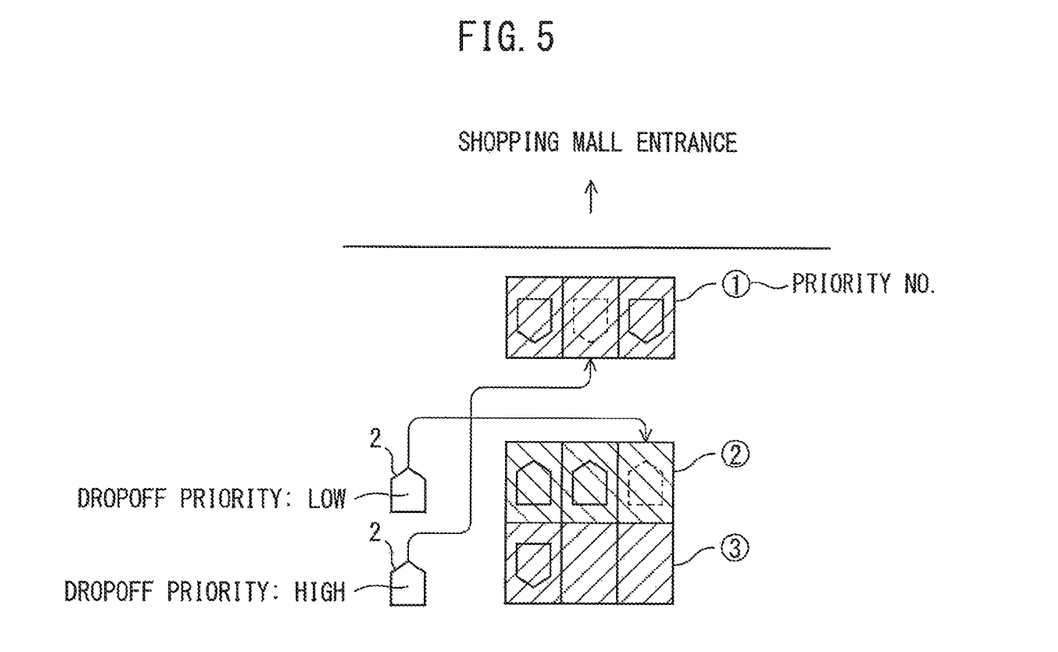
FIG. 5 is a view showing one example of a method of determining stopping positions of vehicles according to one embodiment of the present disclosure in the case where the desired drop-off points of two vehicles are a parking space in a certain area of a parking lot of a shopping mall etc.

Further, if the desired drop-off points of two vehicles 2 are set to parking spaces in a certain area of a parking lot of a shopping mall etc., the server 4, for example, sets the stopping positions of the vehicles 2 in the following way.

As shown in FIG. 5, for example, parking spaces in parking lots of shopping malls etc. are assigned priority numbers in order from the most convenient and safe sections for each certain area (in the example shown in FIG. 5, no. 1 to no. 3). Further, if assuming that two vehicles 2 simultaneously arrive at the parking lot of the shopping mall, in the server 4, as shown in FIG. 5, when the desired drop-off points of the customers 3 of the vehicles 2 are set to the no. 1 area in front of the entrance to the shopping mall, if there is only one car's worth of parking space in the no. 1 area, the stopping position of the high vehicle stopping priority vehicle 2 is set as the parking space of the No. 1 area, while the stopping position of the vehicle 2 with the low vehicle stopping priority is set as the parking space of an empty area in the no. 2 and later parking spaces. Note that, whether or not each area has an empty parking space may, for example, be judged by the server 4 communicating with a parking lot management center managing the occupancies of parking spaces in the parking lot separate from the server 4.

Returning to FIG. 3, at step S8, the car-mounted device 20 of a vehicle 2a traveling to the destination of the customer 3 makes the vehicle 2a stop inside the drop-off area corresponding to that destination and drop off the customer 3a. Further, the car-mounted device 20 of the vehicle 2, for example, confirms that the customer 3a has been dropped off by the door opening and closing operation or the inside camera 214 and, if so, sends a drop-off notification to the server 4.

At this time, if the car-mounted device 20 of the vehicle 2a received the stopping position of the vehicle 2a from the server 4, it makes the vehicle 2a stop at the stopping position inside the drop-off area and drop off the customer 3a. On the other hand, if the car-mounted device 20 of the vehicle 2a did not receive the stopping position of the vehicle 2a from the server 4, it makes the vehicle 2a stop at the desired drop-off point in the drop-off area which the customer 3a picked up by the vehicle 2a designates and drop off the customer 3a.

Figure 6:
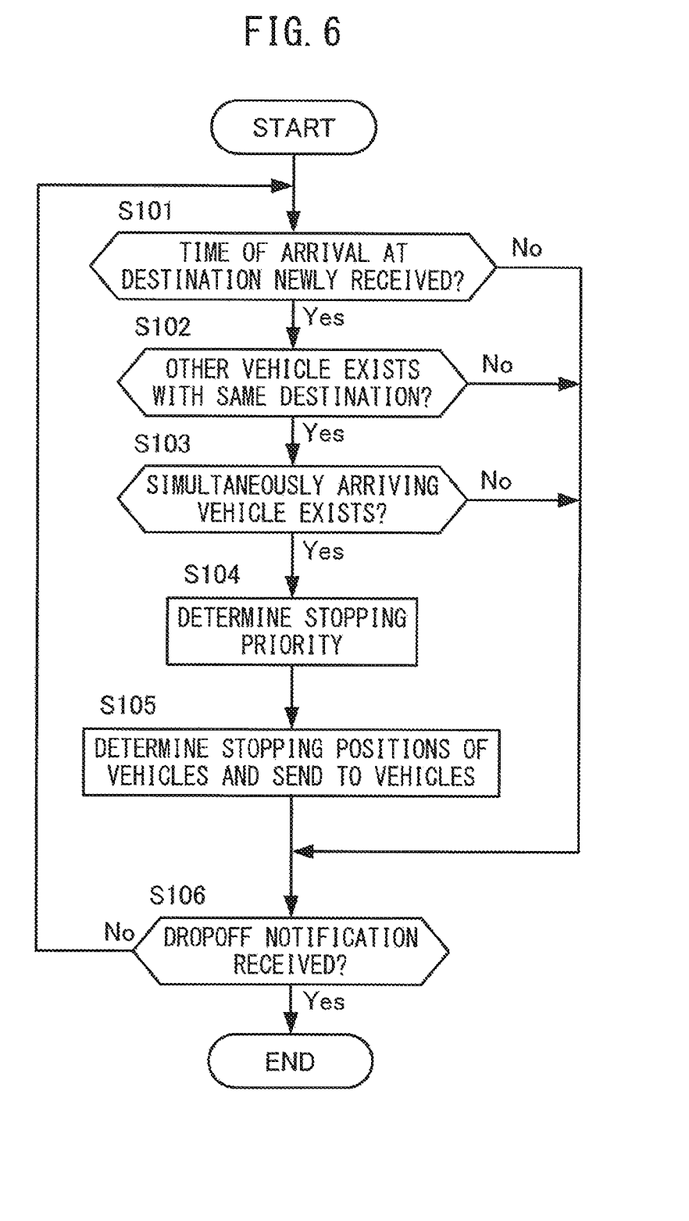
FIG. 6 is a flow chart explaining a part relating to traffic control processing according to one embodiment of the present disclosure in processing performed at a server.

FIG. 6 is a flow chart explaining a part of processing performed at a server 4 relating to traffic control processing according to the present embodiment (in more detail, the control part 43 of the server 4). The server 4 receives a car dispatch request of the vehicle 2 from the mobile terminal 30 of the customer 3a, then receives a pick-up notification from the car-mounted device 20 of the vehicle 2a selected as the responding vehicle. If so, it runs the present routine.

At step S101, the server 4 judges if it has newly received a time of arrival at the destination of the vehicle 2a which is periodically calculated at the car-mounted device 20 of the vehicle 2a. If it has newly received a time of arrival at the destination of the vehicle 2a, the server 4 proceeds to the processing of step S102. On the other hand, if it has not newly received a time of arrival at the destination of the vehicle 2a, the server 4 proceeds to the processing of step S106.

At step S102, the server 4 searches in the plurality of vehicles 2 for one or more other vehicles 2 with the same destination as the vehicle 2a which has picked up the customer 3a. If there is even one other vehicle 2 with the same destination as the vehicle 2a, the server 4 proceeds to the processing of step S103. On the other hand, if there is not even one other vehicle 2 with the same destination as the vehicle 2a, the server 4 proceeds to the processing of step S106.

At step S103, the server 4 searches in the other vehicles 2 with the same destination as the vehicle 2a for a vehicle with a time of arrival of the destination at the same time frame as the time of arrival at the destination of the vehicle 2a, that is, a simultaneously arriving vehicle 2b. If there are one or more simultaneously arriving vehicles 2b, the server 4 proceeds to the processing of step S104. On the other hand, if there are no simultaneously arriving vehicles 2b, the server 4 proceeds to the processing of step S106.

At step S104, the server 4 determines the vehicle stopping priorities of the vehicle 2a and simultaneously arriving vehicle 2b based on the priority determination information of the customers 3 of the vehicle 2a and simultaneously arriving vehicle 2b.

At step S105, the server 4 sets the stopping positions of the vehicle 2a and simultaneously arriving vehicle 2b in the drop-off area of the destination based on the vehicle stopping priorities of the vehicle 2a and simultaneously arriving vehicle 2b and sends the same to the car-mounted devices 20 of the vehicle 2a and simultaneously arriving vehicle 2b.

At step S106, the server 4 judges if a drop-off notification informing that the customer 3a has been dropped off from the vehicle 2a has been received from the car-mounted device 20 of the vehicle 2a. If receiving a drop-off notification, the server 4 ends the present routine. On the other hand, if still not receiving the drop-off notification, the server 4 again performs the processing of step S101 after a certain time interval.

The server 4 (traffic control apparatus) according to the present embodiment explained above is provided with a communicating part 41 configured to be able to communicate with the car-mounted devices 20 mounted in a plurality of vehicles controlled to be automatically driven and a control part 43. Further, the control part 43 receives a projected time of arrival at the destination (time of arrival at the destination) of one vehicle 2*a* among a plurality of vehicles 2 from the car-mounted device 20 of the one vehicle 2*a* through the communicating part 41 and, if so, judges if there is a simultaneously arriving vehicle 2*b* with the same desired drop-off position at the destination as the one vehicle 2*a* and with a projected time of arrival at the destination in the same time frame from among the plurality of the vehicles 2. It is configured so that if a simultaneously arriving vehicle 2*b* is present, it determines the vehicle stopping priority at the desired drop-off position of the one vehicle 2*a* and simultaneously arriving vehicle 2*b* based on the information relating to the customers 3 (passengers) of the one vehicle 2*a* and simultaneously arriving vehicle 2*b* being dropped off.

Specifically, the control part 43 is configured to determine the stopping positions of the vehicle 2*a* and simultaneously arriving vehicle 2*b* based on the vehicle stopping priorities and send the determined stopping positions through the communicating part 41 to the car-mounted devices 20 of the one vehicle 2*a* and simultaneously arriving vehicle 2*b* and, furthermore, is configured to make the stopping position of the vehicle with the higher vehicle stopping priority between the one vehicle 2*a* and simultaneously arriving vehicle 2*b* the desired drop-off position.

Due to this, if there are a plurality of customers 3 picked up at different vehicles 2 controlled to be automatically driven and desiring to be dropped off at a certain desired drop-off point, it is possible to make the customers 3 who should be preferentially dropped off at the desired drop-off point based on the information relating to the customers 3 be dropped off at the desired drop-off point.

In particular, by using as information relating to the passengers of one vehicle 2*a* and simultaneously arriving vehicle 2*b* the age, any pregnancy, any accompanying infants or toddlers, any disability, class of disability, any sickness, and severity of sickness, it is possible to keep the situation from arising where these senior citizens etc. cannot be dropped off at the desired drop-off point and, for example, have to be dropped off at locations away from convenient and safe locations and possible to realize smooth drop-off.

Above, embodiments of the present disclosure were explained, but the above embodiments only show some of the examples of application of the present disclosure and are not meant to limit the technical scope of the present disclosure to the specific constitutions of the above embodiments.

For example, in the above embodiments, the plurality of vehicles 2 were automated driving vehicles providing taxi and other car dispatch services, but some of the plurality of vehicles 2 may also be automated driving vehicles owned by individuals. In this case, a vehicle 2 owned by an individual among the plurality of the vehicles 2 should also periodically send the server 4 the time of arrival at the designation arriving at the desired drop-off point at the destination set by the owner (corresponding to customer 3).

The invention claimed is:

1. A traffic control apparatus comprising: a communication circuit configured to be able to communicate with car-mounted devices mounted in a plurality of vehicles controlled to be automatically driven; and a processor configured to: receive from the car-mounted device of one vehicle among the plurality of vehicles through the communication circuit, a projected time of arrival of the one vehicle at a destination within a drop-off area divided into a plurality of sections, each section is assigned a priority number; judge when, among the plurality of vehicles, there is a simultaneously arriving vehicle with a same desired drop-off position at the destination as the one vehicle and with the projected time of arrival at the destination at a same time frame; and, when there is a simultaneously arriving vehicle, determine vehicle stopping priorities at the desired drop-off position between the one vehicle and the simultaneously arriving vehicle based on information relating to passengers in the one vehicle and the simultaneously arriving vehicle to be dropped off at the destination, set stopping positions of the one vehicle and the simultaneously arriving vehicle within different sections of the drop-off area based on the vehicle stopping priorities and the priority numbers of the sections of the drop-off area, and send the stopping positions to the one vehicle and the simultaneously arriving vehicle to cause the one vehicle and the simultaneously arriving vehicle to stop at the stopping positions.

2. The traffic control apparatus according to claim 1, wherein the processor is further configured to:
determine stopping positions of the one vehicle and the simultaneously arriving vehicle based on the vehicle stopping priorities; and
send the stopping positions through the communicating part to the car-mounted devices of the one vehicle and the simultaneously arriving vehicle.

3. The traffic control apparatus according to claim 2, wherein the processor is further configured to make the stopping position of the vehicle with a higher vehicle stopping priority in the one vehicle and the simultaneously arriving vehicle the desired drop-off position.

4. The traffic control apparatus according to claim 1, wherein the information relating to the passengers of the one vehicle and the simultaneously arriving vehicle is age, any pregnancy, any accompanying infants or toddlers, any disability, a class of disability, any sickness, and a severity of sickness.

5. A traffic control system comprising: car-mounted devices mounted in a plurality of vehicles which are controlled to be automatically driven; and a server connected to be able to communicate with the car-mounted devices through a network, wherein each car-mounted device includes a processor configured to: periodically calculate a projected time of arrival of a vehicle at a drop-off point within a drop-off area divided into a plurality of sections, each section is assigned a priority number; and periodically transmit, to the server, position information showing a current location of the vehicle in which the car-mounted device is mounted while the vehicle is being driven and the projected time of arrival at the drop-off point, and the server is configured to: receive the position information and the projected time of arrival from each car-mounted device; search through the projected time of arrival of the plurality of vehicles to determine when there are two or more simultaneously arriving vehicles with a same desired drop-off point and a time of arrival with a same time frame; when there are two or more simultaneously arriving vehicles, determine vehicle stopping priorities at the desired drop-off position between the two or more simultaneously arriving vehicles based on information relating to passengers in the two or more simultaneously arriving vehicles; set stopping positions of the simultaneously arriving vehicles within different sections of the drop-off area based on the vehicle stopping priorities and the priority numbers of the sections of the drop-off area; and send the stopping positions to the simultaneously arriving vehicles to cause the simultaneously arriving vehicles to stop at the stopping positions.

6. A traffic control method comprising: receiving, through a communication circuit configured to be able to communicate with car-mounted devices mounted in a plurality of vehicles which are controlled to be automatically driven from a car-mounted device of one vehicle among the plurality of the vehicles, a projected time of arrival of the one vehicle at a destination within a drop-off area divided into a plurality of sections, each section is assigned a priority number; judging when, among the plurality of vehicles, there is a simultaneously arriving vehicle with a same desired drop-off position at the destination as the one vehicle and with the projected time of arrival at the destination in a same time frame; and when there is a simultaneously arriving vehicle, determining vehicle stopping priorities at the desired drop-off position between the one vehicle and the simultaneously arriving vehicle based on information relating to passengers in the one vehicle and the simultaneously arriving vehicle to be dropped off at the destination, setting stopping positions of the one vehicle and the simultaneously arriving vehicle in different sections of the drop-off area based on the vehicle stopping priorities and the priority numbers of the sections of the drop-off area, and sending the stopping positions to the one vehicle and the simultaneously arriving vehicle to cause the one vehicle and the simultaneously arriving vehicle to stop at the stopping positions.

7. A non-transitory computer recording medium including a computer program for traffic control use for making a computer: receive, through a communication circuit configured to be able to communicate with car-mounted devices mounted in a plurality of vehicles which are controlled to be automatically driven from a car-mounted device of one vehicle among the plurality of the vehicles, a projected time of arrival of the one vehicle at a destination within a drop-off area divided into a plurality of sections, each section is assigned a priority number; judge when, among the plurality of vehicles, there is a simultaneously arriving vehicle with a same desired drop-off position at the destination as the one vehicle and with the projected time of arrival at the destination in a same time frame; and when there is a simultaneously arriving vehicle, determine vehicle stopping priorities at the desired drop-off position between the one vehicle and the simultaneously arriving vehicle based on information relating to passengers in the one vehicle and the simultaneously arriving vehicle to be dropped off at the destination, set stopping positions of the one vehicle and the simultaneously arriving vehicle within different sections of the drop-off area based on the vehicle stopping priorities and the priority numbers of the sections of the drop-off area, and send the stopping positions to the one vehicle and the simultaneously arriving vehicle to cause the one vehicle and the simultaneously arriving vehicle to stop at the stopping positions.

* * * * *